United States Patent
Slavens et al.

(10) Patent No.: US 10,626,796 B2
(45) Date of Patent: Apr. 21, 2020

(54) FILM COOLING PASSAGE WITH MULTIDIMENSIONAL DIFFUSION

(71) Applicant: United Technologies Corporation, Farmington, CT (US)

(72) Inventors: Thomas N. Slavens, Moodus, CT (US); Carey Clum, East Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 305 days.

(21) Appl. No.: 14/827,773

(22) Filed: Aug. 17, 2015

(65) Prior Publication Data

US 2017/0051673 A1 Feb. 23, 2017

(51) Int. Cl.
*F02C 7/18* (2006.01)
*F01D 5/18* (2006.01)

(52) U.S. Cl.
CPC ............... *F02C 7/18* (2013.01); *F01D 5/186* (2013.01); *F05D 2220/32* (2013.01); *F05D 2260/202* (2013.01)

(58) Field of Classification Search
CPC ............... F02C 7/18; F05D 2260/2214; F05D 2260/202; F05D 2260/203; F05D 2250/71; F05D 2250/73; F05D 2250/25; F23R 2900/03042; F23R 2900/03041; F01D 5/182; F01D 5/183; F01D 5/186; F01D 25/12
See application file for complete search history.

(56) References Cited

U.S. PATENT DOCUMENTS

| | | | |
|---|---|---|---|
| 6,368,060 B1 * | 4/2002 | Fehrenbach | F01D 5/186 416/97 A |
| 8,066,484 B1 | 11/2011 | Liang | |
| 2010/0068033 A1 | 3/2010 | Liang | |
| 2012/0102959 A1 * | 5/2012 | Starkweather | F23R 3/04 60/752 |
| 2013/0205793 A1 * | 8/2013 | Xu | F23R 3/06 60/754 |
| 2013/0280092 A1 * | 10/2013 | Xu | F01D 5/187 416/97 R |
| 2016/0245094 A1 * | 8/2016 | Bunker | F01D 5/186 |

OTHER PUBLICATIONS

European Search Report and Communication; Application No. 16184207.5-1610; 10 pages; dated Dec. 13, 2016.

* cited by examiner

*Primary Examiner* — Andrew H Nguyen
(74) *Attorney, Agent, or Firm* — Cantor Colburn LLP

(57) ABSTRACT

A film-cooled component for a gas turbine engine includes a first surface of the component located at a gas path of a gas turbine engine, a second surface of the component defining a component passage, and a cooling airflow passage extending from the second surface to the first surface to convey a cooling airflow from the passage and emit the cooling airflow at the first surface. The cooling airflow passage is curvilinearly diffused in at least two directions relative to a local gas flow direction in the gas path. A method of cooling a component includes flowing a cooling airflow into an internal component passage of the turbine component, conveying the cooling airflow through a cooling airflow passage, diffusing the cooling airflow in at least two directions along the airflow passage, and emitting the cooling airflow at a gas path surface to cool the gas path surface of the component.

13 Claims, 4 Drawing Sheets

FILM COOLING PASSAGE WITH MULTIDIMENSIONAL DIFFUSION

BACKGROUND

This disclosure relates to gas turbine engines, and more particularly to film cooling of turbine components of gas turbine engines.

Advancements in performance of turbomachines, such as gas turbine engines, performance has often been linked to overall pressure ratio of the turbomachine and a turbine inlet temperature that can be sustained during operation of the turbomachine. Increases in efficiency through increases in pressure ratio and/or turbine inlet temperature typically results in an increase in operating temperatures of turbine flow path components, in which temperatures of the working fluid in the turbine flow path is often several hundred degrees Fahrenheit higher than the melting point of component materials.

Cooling air is often extracted from lower temperature portions of the turbomachine, for example, the compressor, and is utilized to cool the turbine components. One type of cooling utilized with this cooling flow is film cooling where the cooling air is delivered to an interior of the component then emitted over an external surface of the component. The cooling air is typically emitted through cooling holes that are machined into the part, and are circular in cross-section. Diffusion shapes are often added around the hole at the external surface.

Diverting the cooling air from the compressor incurs efficiency penalties that increase with the increase in cooling air use due to increases in pressure ratio and/or turbine inlet temperature. Thus, to reduce the efficiency penalty, it is desired to reduce the necessary cooling flow by increasing film cooling effectiveness.

BRIEF SUMMARY

In one embodiment, a film-cooled component for a gas turbine engine includes a first surface of the component located at a gas path of a gas turbine engine, a second surface of the component defining a component passage, and a cooling airflow passage extending from the second surface to the first surface to convey a cooling airflow from the passage and emit the cooling airflow at the first surface. The cooling airflow passage is curvilinearly diffused in at least two directions relative to a local gas flow direction in the gas path.

Additionally or alternatively, in this or other embodiments the first surface is an external surface of the component and the second surface is an internal surface of the component.

Additionally or alternatively, in this or other embodiments the cooling airflow passage is defined along a major axis by a first radius and a second radius laterally offset from the first radius and greater than the second radius.

Additionally or alternatively, in this or other embodiments the first radius is defined in a first plane at a first angle ranging from 15 degrees to 90 degrees to the gas flow direction and the second radius is defined in a second plane angularly offset from both the first plane and the gas flow direction.

Additionally or alternatively, in this or other embodiments the angular offset is in the range of 0 to 50 degrees.

Additionally or alternatively, in this or other embodiments a cooling airflow passage inlet has a circular cross-section.

Additionally or alternatively, in this or other embodiments a cooling airflow passage outlet has a non-circular cross-section and has a major axis with a lateral component perpendicular to the gas flow direction and a streamwise component parallel to the gas flow direction.

Additionally or alternatively, in this or other embodiments elongation of the cooling airflow passage increases continuously with distance from the second surface.

Additionally or alternatively, in this or other embodiments the component is a turbine vane.

Additionally or alternatively, in this or other embodiments the component is formed via additive manufacturing.

In another embodiment, a gas turbine engine includes a combustor and a turbine positioned in fluid communication with the combustor. The turbine has a plurality of turbine components, and a least one turbine component includes a first surface of the turbine component located at the gas path, a second surface of the turbine component defining a component passage, and a cooling airflow passage extending from the second surface to the first surface to convey a cooling airflow from the component passage and emit the cooling airflow at the first surface. The cooling airflow passage is curvilinearly diffused in at least two directions relative to a local gas flow direction in the gas path as the cooling airflow passage extends from the second surface to the first surface.

Additionally or alternatively, in this or other embodiments the first surface is an external surface of the component and the second surface is an internal surface of the component.

Additionally or alternatively, in this or other embodiments the cooling airflow passage is defined along a major axis by a first radius and a second radius laterally offset from the first radius and greater than the second radius.

Additionally or alternatively, in this or other embodiments the first radius is defined in a first plane at a first angle ranging from 15 degrees to 90 degrees to the gas flow direction and the second radius is defined in a second plane angularly offset from both the first plane and the gas flow direction.

Additionally or alternatively, in this or other embodiments the angular offset is in the range of 0 to 50 degrees.

Additionally or alternatively, in this or other embodiments a cooling airflow passage inlet has a circular cross-section.

Additionally or alternatively, in this or other embodiments a cooling airflow passage outlet has a non-circular cross-section and has a major axis with a lateral component perpendicular to the gas flow direction and a streamwise component parallel to the gas flow direction.

Additionally or alternatively, in this or other embodiments a degree of diffusion of the cooling airflow passage increases continuously with distance from the second surface.

Additionally or alternatively, in this or other embodiments the turbine component is formed via additive manufacturing.

In yet another embodiment, a method of cooling a turbine component of a gas turbine engine includes flowing a cooling airflow into an internal component passage of the turbine component, conveying the cooling airflow through a cooling airflow passage, diffusing the cooling airflow in at least two directions along the airflow passage, and emitting the cooling airflow at a gas path surface of the component to cool the gas path surface of the component.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
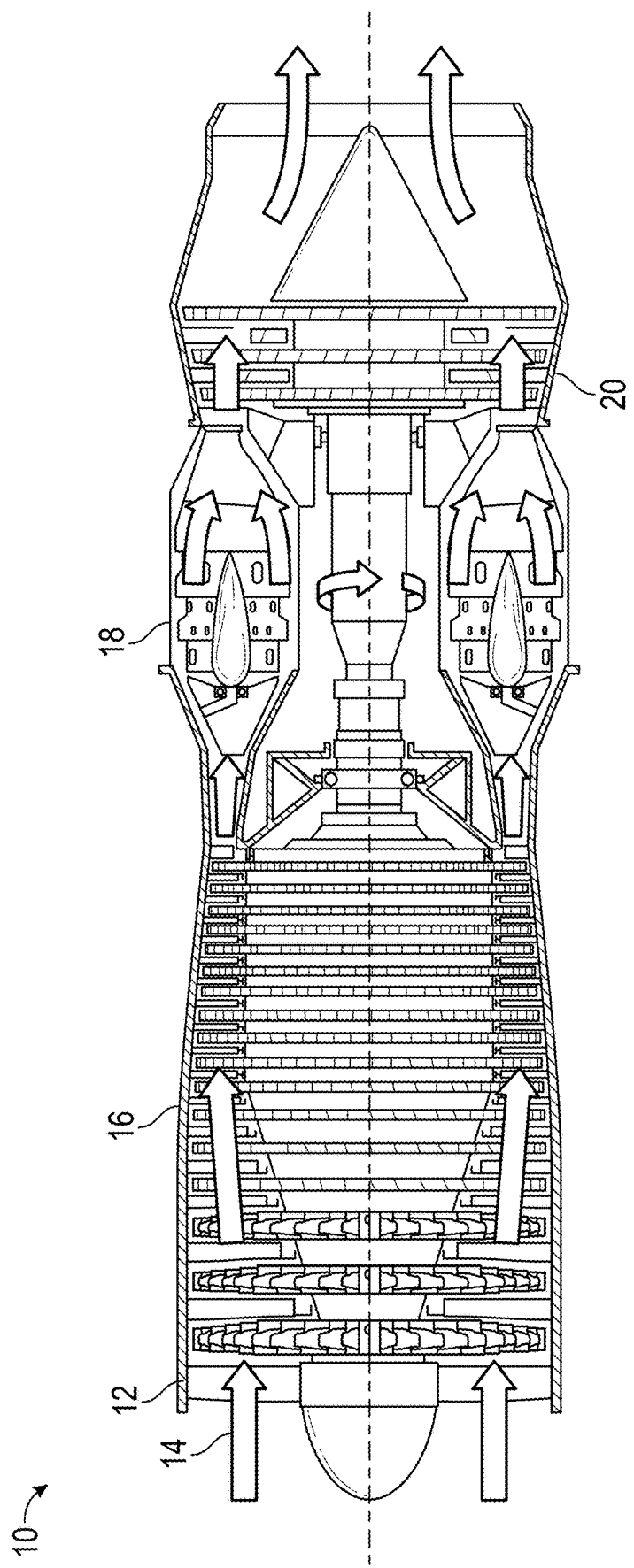
FIG. 1 is a schematic cross-sectional view of a gas turbine engine.

FIG. 1 is a schematic illustration of a gas turbine engine 10. The gas turbine engine generally has a fan 12 through which ambient air is propelled in the direction of arrow 14, a compressor 16 for pressurizing the air received from the fan 12 and a combustor 18 wherein the compressed air is mixed with fuel and ignited for generating combustion gases.

The gas turbine engine 10 further comprises a turbine section 20 for extracting energy from the combustion gases. Fuel is injected into the combustor 18 of the gas turbine engine 10 for mixing with the compressed air from the compressor 16 and ignition of the resultant mixture. The fan 12, compressor 16, combustor 18, and turbine 20 are typically all concentric about a common central longitudinal axis of the gas turbine engine 10.

The gas turbine engine 10 may further comprise a low pressure compressor located in front of a high pressure compressor and a high pressure turbine located in front of a low pressure turbine. For example, the compressor 16 may be a multi-stage compressor 16 that has a low-pressure compressor and a high-pressure compressor and the turbine 20 may be a multistage turbine 20 that has a high-pressure turbine and a low-pressure turbine. In one embodiment, the low-pressure compressor is connected to the low-pressure turbine and the high pressure compressor is connected to the high-pressure turbine.

Figure 2:
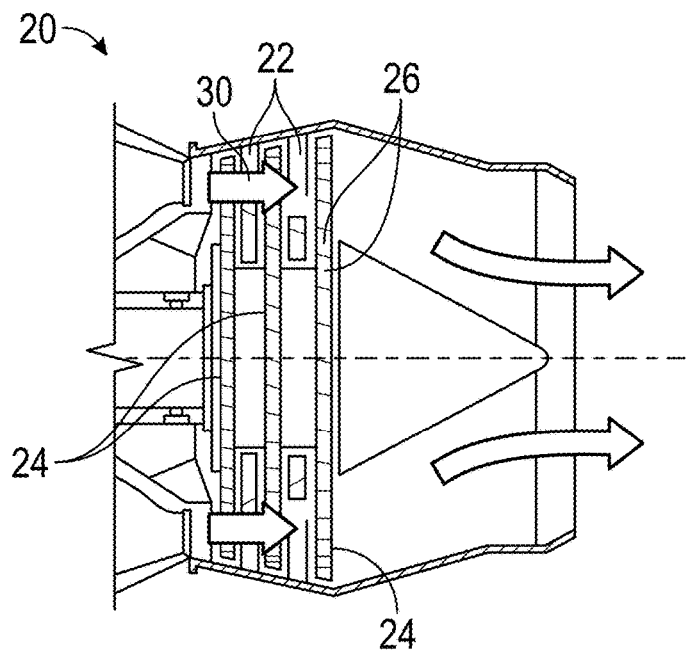
FIG. 2 is a schematic cross-sectional view of a turbine section of a gas turbine engine.

Referring to FIG. 2, the turbine 20 includes one or more sets, or stages, of fixed turbine vanes 22 and turbine rotors 24, each turbine rotor 24 including a plurality of turbine blades 26. The turbine vanes 22 and the turbine blades 26 define a gas path for gas flow 30 through the turbine. The turbine vanes 22 and the turbine blades 26 utilize a cooling airflow to maintain the turbine components within a desired temperature range. In some embodiments, the cooling airflow may flow internal through the turbine components to cool the components internally, while in other embodiments, the cooling airflow is utilized to form a cooling film on external surfaces of the components.

Figure 3:
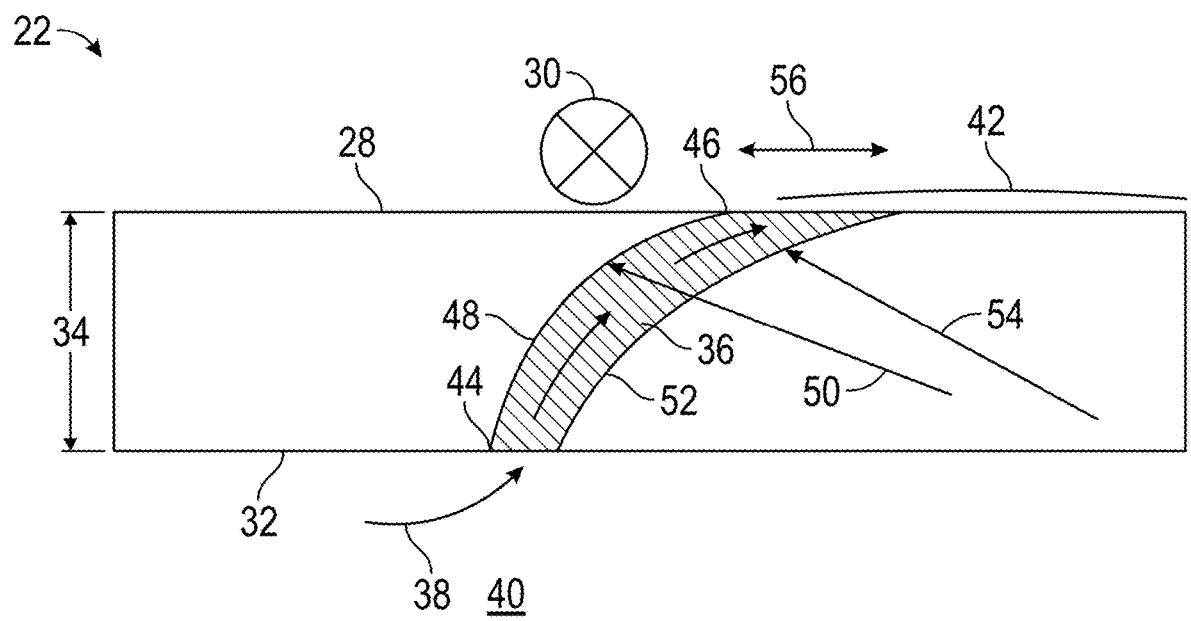
FIG. 3 is a cross-sectional view, perpendicular to a turbine gas flow direction, of an embodiment of a cooling airflow passage for a turbine component.

Shown in FIG. 3 is a partial cross-sectional view of an embodiment of a turbine component utilizing film cooling, for example, a turbine vane 22. While the embodiments herein are described with reference to turbine vane 22, it is to be appreciated that the present disclosure could be readily applied to other components such as turbine rotor 24, turbine blades 26, turbine case, combustor liners, blade outer air seals, or the like. The turbine vane 22 has an external surface 28 (a first surface) interactive with the gas flow 30 (shown into the paper in FIG. 3) through the turbine 20 and an internal surface 32 (a second surface) offset from the external surface 28 by a vane material thickness 34. The turbine vane 22 includes one or more cooling airflow passages 36 extending through the vane material thickness 34 from the internal surface 32 to the external surface 28. The cooling airflow passage 36 conveys a cooling airflow 38 from an internal passage 40 or component passage defined by the internal surface 32 and emits the cooling airflow 38 across the external surface 28 to form a cooling film 42 at the external surface 28 to thermally protect the external surface 28 from the gas flow 30. In some embodiments, the turbine vane 22 is formed via additive manufacturing methods such as 3-D printing or material deposition to allow inclusion of the cooling airflow passage 36. In other embodiments, the turbine vane 22 is formed via other methods such as casting, where the cooling airflow passage 36 may be cast in, or added after casting in secondary processing.

The cooling airflow passage 36 includes a passage inlet 44 at the internal surface 32 and a passage outlet 46 at the external surface 28. In some embodiments, the passage inlet 44 is circular, while the passage outlet 46 is non-circular, in some embodiments oval or elliptical in shape. The cooling airflow passage 36 diffuses the cooling airflow 38 by having an outlet area greater than an inlet area. The cooling airflow passage 36 as seen in the cross-section of FIG. 3 has an outboard surface 48 defined by an outboard surface radius 50 and an inboard surface 52 defined by an inboard surface radius 54. The inboard surface radius 54 is larger than the outboard surface radius 50, resulting in enlarging of the cooling airflow passage 36 in a lateral direction 56, substantially perpendicular to the gas flow 30, as the cooling airflow passage 36 extends through the material thickness 34 from the passage inlet 44 to the passage outlet 46.

Figure 4:
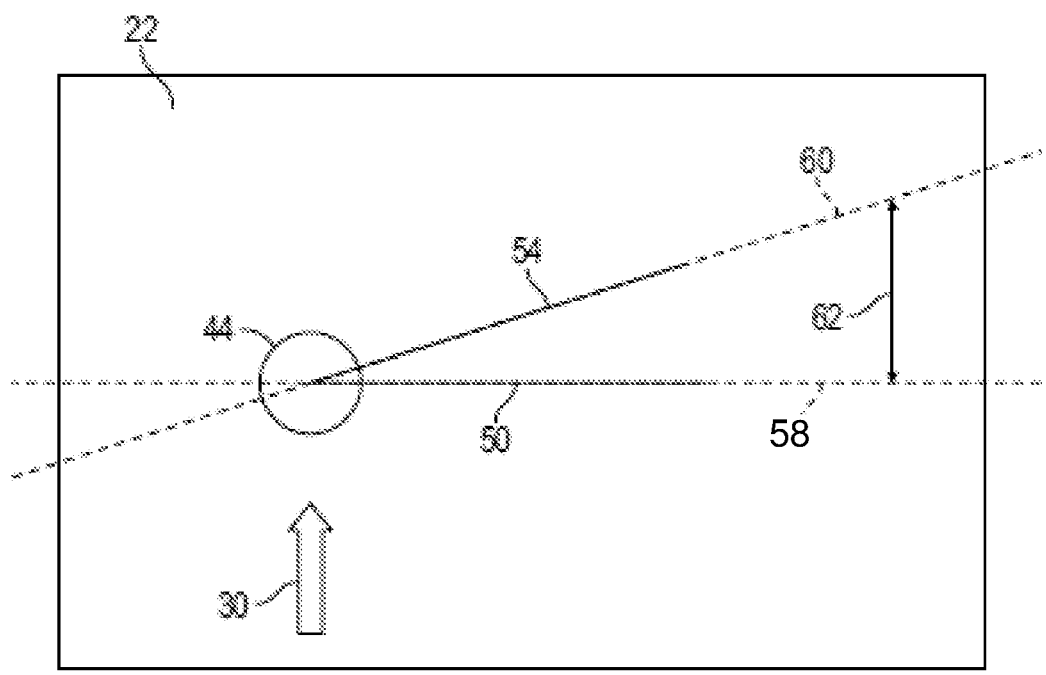
FIG. 4 is a view of an exterior surface of a turbine component including an outlet of a cooling airflow passage.

Referring now to FIG. 4, the outboard surface radius 50 is defined in an outboard surface radius plane 58 that is at an angle of between 15 and 90 degrees to the gas flow 30, while the inboard surface radius 54 is defined in an inboard surface radius plane 60, angularly offset from the outboard surface radius plane 58. The angular offset introduces diffusion of the cooling airflow passage 36 in a streamwise direction 62, substantially parallel to the gas flow 30. The degree of streamwise diffusion depends on the degree of angular offset of the inboard surface radius plane 60 relative to the outboard surface radius plane 58. In some embodiments, the angular offset is in a range of 0 to 50 degrees.

Figure 5C:
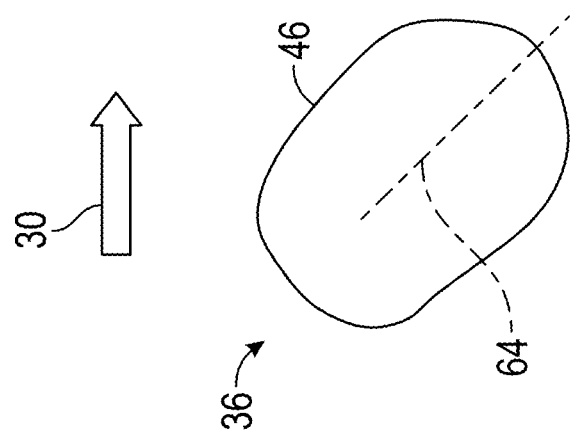
FIG. 5C is a view of a cooling airflow passage outlet.
Figure 5B:
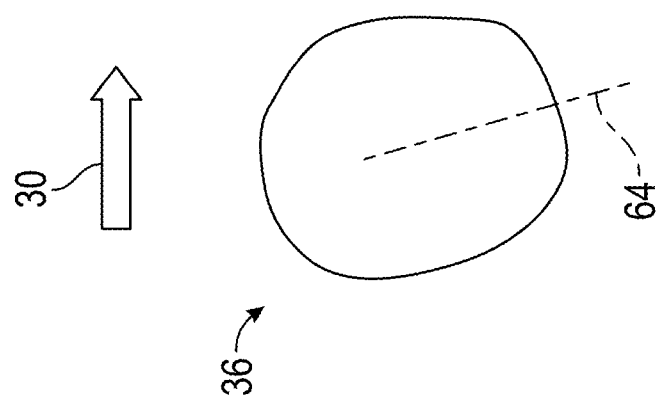
FIG. 5B is a view of a cooling airflow passage at an interior of a turbine component.
Figure 5A:
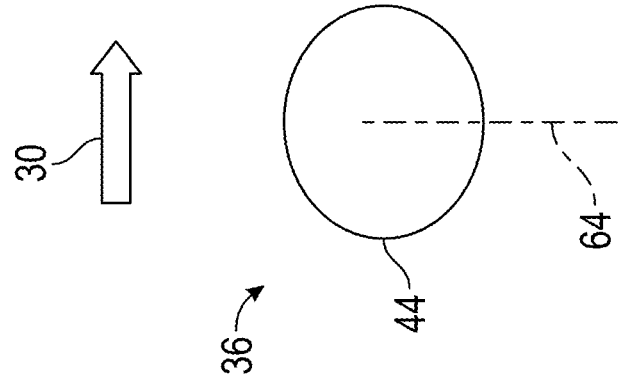
FIG. 5A is a view of a cooling airflow passage inlet.

Referring now to FIGS. 5A-5C, the diffusion of the cooling airflow passage 36 is illustrated as the cooling airflow passage 36 progresses through the material thickness 34. In FIG. 5A, the passage inlet 44 is illustrated. The passage inlet 44 is circular or near-circular with a major axis 64 perpendicular to the gas flow 30. Referring to FIG. 5B, shown is a profile of the cooling airflow passage 36 at a point approximately midway through the material thickness 34. At this point, the cooling airflow passage 36 is elongated along the major axis 64, which now has a streamwise component, in a direction parallel to the gas flow. Finally, the passage outlet 46 is illustrated in FIG. 5C. The passage outlet 46 is further diffused relative to the cross-section of FIG. 5B, with the major axis 64 having a greater streamwise component. Thus, the cooling airflow passage curvilinearly diffuses in at least two directions relative to a local gas flow direction in the gas path. The cooling airflow passage 36 has both lateral and streamwise curvilinear diffusion through the material thickness 34 allowing for improved cooling film 42 attachment to the external surface 28 and improved cooling performance.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A film-cooled component for a gas turbine engine, comprising:
   a first surface of the component located at a gas path of the gas turbine engine;
   a second surface of the component defining a component passage; and
   a cooling airflow passage extending from the second surface to the first surface to convey a cooling airflow from the passage and emit the cooling airflow at the first surface, the cooling airflow passage diffusing in both a streamwise direction relative to a local hot gas flow in the gas path and a lateral direction perpendicular to the streamwise direction;
   wherein the cooling airflow passage is defined along the lateral direction by a first passage surface defined by a first radius and a second passage surface defined by a second radius offset in the lateral direction from the first radius;
   wherein the second radius is greater than the first radius;
   wherein the cooling passage includes:
      a non-circular passage inlet at the second surface of the component with an inlet cross-sectional major axis in the second surface perpendicular to the streamwise direction; and
      a passage outlet at the first surface of the component with an outlet cross-sectional major axis in the first surface angularly offset from the inlet cross-sectional major axis and from the streamwise direction, the passage outlet one of oval or elliptical.

2. The film-cooled component of claim 1, wherein the first surface is an external surface of the component and the second surface is an internal surface of the component.

3. The film-cooled component of claim 1 wherein:
   the first radius is defined in a first plane at a first angle ranging from 15 degrees to 90 degrees to a gas flow direction; and
   the second radius is defined in a second plane angularly offset from both the first plane and the gas flow direction.

4. The film-cooled component of claim 3, wherein the second plane is angularly offset from the first plane in the range of 0 to 50 degrees.

5. The film-cooled component of claim 1, wherein elongation of the cooling airflow passage increases continuously with distance from the second surface.

6. The film-cooled component of claim 1, wherein the component is a turbine vane.

7. The film cooled component of claim 1, wherein the component is formed via additive manufacturing.

8. A gas turbine engine, comprising:
   a combustor; and
   a turbine disposed in fluid communication with the combustor, the turbine having a plurality of turbine components, at least one turbine component of the plurality of turbine components including:
      a first surface of the at least one turbine component located at a gas path of the gas turbine engine;
      a second surface of the turbine component defining a component passage; and
      a cooling airflow passage extending from the second surface to the first surface to convey a cooling airflow from the component passage and emit the cooling airflow at the first surface, the cooling airflow passage diffusing in both a streamwise direction relative to a local hot gas flow in the gas path and a lateral direction perpendicular to the streamwise direction as the cooling airflow passage extends from the second surface to the first surface;
      wherein the cooling airflow passage is defined along the lateral direction by a first passage surface defined by a first radius and a second passage surface defined by a second radius offset in the lateral direction from the first radius;
      wherein the second radius is greater than the first radius;
      wherein the cooling passage includes:
         a non-circular passage inlet at the second surface of the component with an inlet cross-sectional major axis in the second surface perpendicular to the streamwise direction; and
         a passage outlet at the first surface of the component with an outlet cross-sectional major axis in the first surface angularly offset from the inlet cross-sectional major axis and from the streamwise direction, the passage outlet one of oval or elliptical.

9. The gas turbine engine of claim 8, wherein the first surface is an external surface of the component and the second surface is an internal surface of the component.

10. The gas turbine engine of claim 8, wherein:
   the first radius is defined in a first plane at a first angle ranging from 15 degrees to 90 degrees to a gas flow direction; and
   the second radius is defined in a second plane angularly offset from both the first plane and the gas flow direction.

11. The gas turbine engine of claim 10, wherein the angular offset is in the range of 0 to 50 degrees.

12. The gas turbine engine of claim 8, wherein a degree of diffusion of the cooling airflow passage increases continuously with distance from the second surface.

13. The gas turbine engine of claim 8, wherein the turbine component is formed via additive manufacturing.

* * * * *